United States Patent [19]

Greenwood et al.

[11] Patent Number: 4,660,418
[45] Date of Patent: Apr. 28, 1987

[54] FLEXIBLE HINGE DEVICE

[75] Inventors: John C. Greenwood, Harlow; David Wilson, Bishops Stortford, both of England

[73] Assignee: International Standard Electric Corporation, New York, N.Y.

[21] Appl. No.: 651,553

[22] Filed: Sep. 17, 1984

[30] Foreign Application Priority Data

Sep. 17, 1983 [GB] United Kingdom ............... 8324955

[51] Int. Cl.$^4$ .............................................. G01P 15/02
[52] U.S. Cl. ..................................... 73/514; 73/517 R
[58] Field of Search ................. 73/514, 517 R, 432 A, 73/652, 654, 35; 16/225, DIG. 13

[56] References Cited

U.S. PATENT DOCUMENTS

| | | |
|---|---|---|
| 2,928,668 | 3/1960 | Blasingame ............................ 73/654 |
| 3,416,373 | 12/1968 | Havens ................................... 73/654 |
| 3,758,830 | 9/1973 | Jackson ............................... 73/517 R |
| 4,359,498 | 11/1982 | Mallon et al. ........................ 73/727 |
| 4,399,707 | 8/1983 | Wamstad ................................ 73/727 |
| 4,483,194 | 11/1984 | Rudolf ............................... 73/517 R |
| 4,488,445 | 12/1984 | Aske ...................................... 73/514 |
| 4,495,814 | 1/1985 | Steinke .................................. 73/514 |
| 4,522,072 | 6/1985 | Sulouff et al. ..................... 73/517 R |

Primary Examiner—Anthony V. Ciarlante
Attorney, Agent, or Firm—James B. Raden; Donald J. Breh

[57] ABSTRACT

A flexible hinge device comprises a laminar silicon body having a groove portion etched away to define a thin flexible strip joining two rigid end portions. The silicon forming the hinge is usually of a single crystal structure. Break-off supports may be provided to support the structure prior to use.

1 Claim, 6 Drawing Figures

FLEXIBLE HINGE DEVICE

BACKGROUND AND SUMMARY OF THE INVENTION

This invention relates to a unitary flexible hinge device, and in particular to such a device formed from a body of single crystal silicon.

According to the invention there is provided a unitary flexible hinge device comprising a laminar body of single crystal silicon having a groove etched therein whereby the body is divided into two rigid portions linked by a relatively thin flexible portion formed by the base of the groove.

Silicon's excellent mechanical properties including substantially no hysteresis or creep and a high strength make it an ideal material for use as a flexible member in various instrumental applications, e.g. in an accelerometer. The flexible region can be made to very precise dimensions using anisotropic etching. In particular this flexible hinge region can be etched to a few microns in thickness by using an etch stop during the process.

BRIEF DESCRIPTION OF THE DRAWING

An embodiment of the invention will now be described with reference to the accompanying drawings in which.

DESCRIPTION OF THE PREFERRED EMBODIMENT

Figure 4:
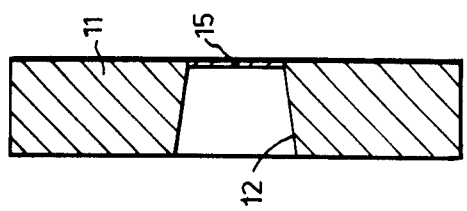
FIG. 4 is a transverse sectional view of the device of FIG. 1.
Figure 1:
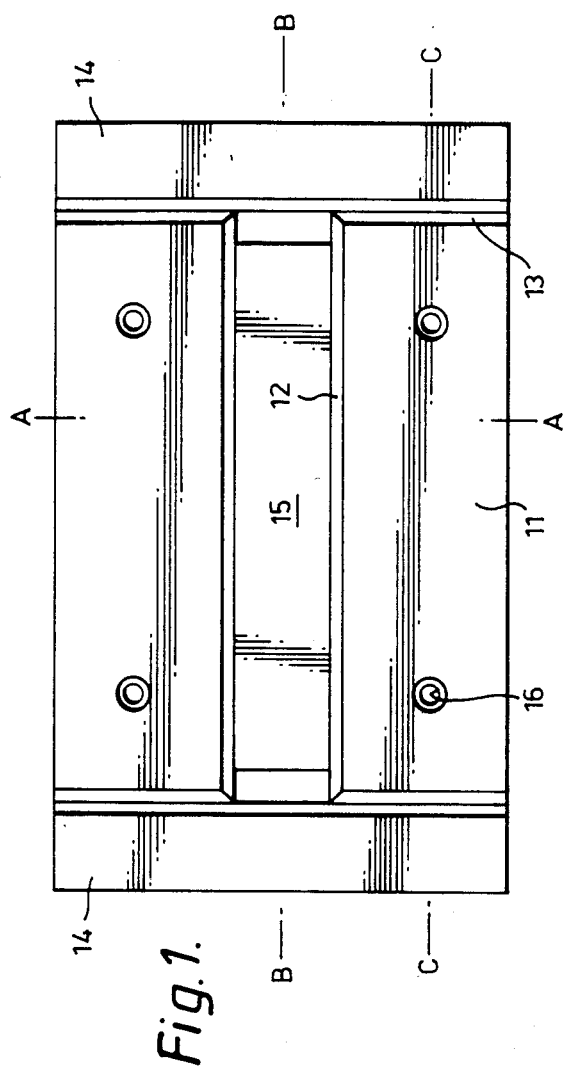
FIG. 1 is a plan view of the hinge device.
Figure 2:
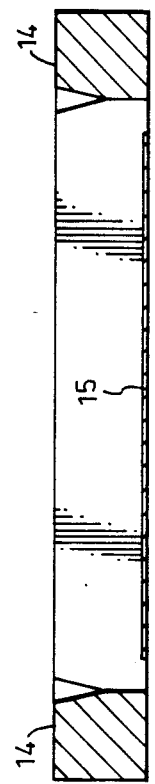
FIG. 2 is a sectional view of the device of FIG. 1 taken along the hinge groove.
Figure 3:
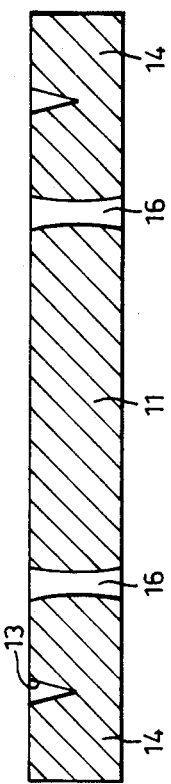
FIG. 3 is a sectional view of the device taken along one of the hinged members.

Referring to the drawings, the hinge device is formed by anisotropic selective etching from a laminar body 11 of single crystal silicon. To effect this etching the silicon body is masked and then treated with an etch solution comprising e.g. a mixture of catechol, ethylene diamine and water or of potassium hydroxide and isopropyl alcohol to form a groove or trough 12 across the body 11 and extending to substantially the whole thickness of the body. Advantageously the body 11 is also etched to form two further grooves 13 transverse to the groove 12 which grooves 13 define break-off support portions 14 which maintain the hinge device in its unflexed state prior to use.

The hinge device may be secured to the members (not shown) to be hinged by an adhesive. Alternatively openings 16 may be etched in the body for the attachment of fasteners (not shown).

The thickness of the base portion 15 providing the flexible member of the hinge device may be defined using an etch stop. This may be achieved by doping this portion of the body 11, prior to etching, with boron to a concentration greater than $4 \times 10^{19}$ atoms/cc. Using the etch materials described there is an abrupt change in the etch rate from that normal for updoped silicon to substantially zero at the boron doped region. The dimensions of the unetched region are defined previously by the boron doping profiled and it will thus be apparent that thickness of the flexible portion 15 of only a few microns can be readily achieved.

Figure 5:
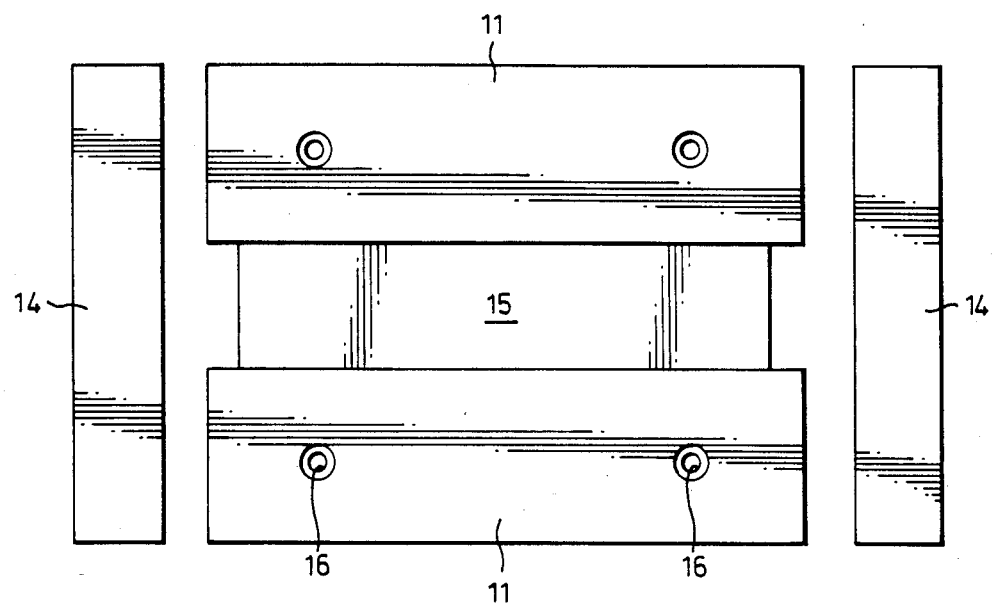
FIG. 5 is a plan view of the device after removal of the support portions.

After etching is complete the mask (not shown) is removed and the hinge device is then ready for installation. The support portions 14 are left attached to the device until installation has been completed whereon they are broken away leaving the assembled hinge intact (FIG. 5).

Figure 6:
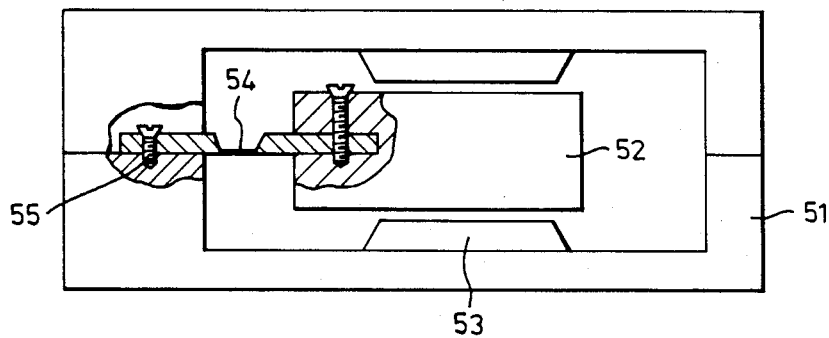
FIG. 6 is a schematic view of an accelerometer employing the device of FIGS. 1 to 5.

FIG. 6 is a sectional schematic view of an accelerometer employing the hinge device of FIGS. 1 to 4. The accelerometer includes a housing 51 within which an inertial mass 52 is supported between end stops 53 via a hinge device 54. The hinge 54 is located in corresponding openings in the housing 51 and inertial mass 52 and is secured therein either by an adhesive or by pins 55 engaging the openings 16 in the device. The hinge allows movement of the mass 52 in response to an accelerating force. This movement being detected e.g. by the change in the electrical capacitance ratio between the two end stops 53 and the mass 52. Other constructions may be envisaged in which the silicon component is more complex and incorporates within it further parts of the complete device including the inertial mass.

What is claimed is:

1. A unitary flexible hinge device comprising a laminar body of single crystal silicon having a hinge groove etched therein extending in an uninterrupted straight line manner across said body between a pair of opposite edges thereof, dividing said body into two rigid body portions on opposite sides of said hinge groove, said hinge groove having a depth forming a substantially thin flat hinge groove bottom connecting said two rigid body portions, said hinge groove bottom being flexible along the entire length of said groove, said body includes two additional grooves each extending transverse to said hinge groove in an interrupted straight line manner across a respective one of said pair of body portions between a second pair of opposite edges thereof forming a pair of support portions each extending across said hinge groove rigidly connecting said two body portions together, each said support portion being removable from said body portions at said two additional grooves.

* * * * *